J. C. WRIGHT.
GRAIN AND STOCK-RACK.

No. 185,416.                    Patented Dec. 19, 1876.

Witnesses:
Floyd Norris
Jno. D. Patten

Inventor:
Joshua C. Wright,
by Johnson & Johnson
Att'ys

UNITED STATES PATENT OFFICE.

JOSHUA C. WRIGHT, OF KAHOKA, MISSOURI.

IMPROVEMENT IN GRAIN AND STOCK RACKS.

Specification forming part of Letters Patent No. 185,416, dated December 19, 1876; application filed January 3, 1876.

*To all whom it may concern:*

Be it known that I, JOSHUA C. WRIGHT, of Kahoka, in the county of Clarke and State of Missouri, have invented new and useful Improvements in Convertible Grain and Stock Racks, of which the following is a specification:

My wagon-rack is adapted for carrying hay, grain in the sheaf, and is convertible for stock. For grain it is especially suited to save the loose grain that may be shaken from the bundles, and which would otherwise be lost, the object being to furnish the farmer with a cheap wagon-rack, which may be easily and quickly changed into a stock-wagon. Inclined rack-raves are supported at each side of the wagon in positions inclining downward, upon extensions of cross-frames, secured to the head and tail boards of the wagon. In these positions they are adapted for carrying hay and grain, and are provided with central hinged supports which rest upon a cross-piece at the bottom of the wagon, while the rack-raves are secured by bolts to the extensions of the end frames, to keep the raves in place upon the wagon-sides. The rack-raves have outer edge-guards and end vertical racks, so that the waste grain is delivered into the wagon-box.

In converting the wagon-rack for carrying stock the bolts of the rack-raves are removed, the raves drawn out slightly, and the bolts changed to form pivots, upon which the rack-raves are turned up in vertical positions, to form extensions to the wagon-sides, with their vertical end racks closing in against each other next to the outer sides of the head and tail boards of the body, to form a comparatively deep inclosure. A simple change, therefore, in the positions of the rack-raves is all that is necessary to obtain the advantages of a grain and stock rack in the same wagon.

Figure 1:
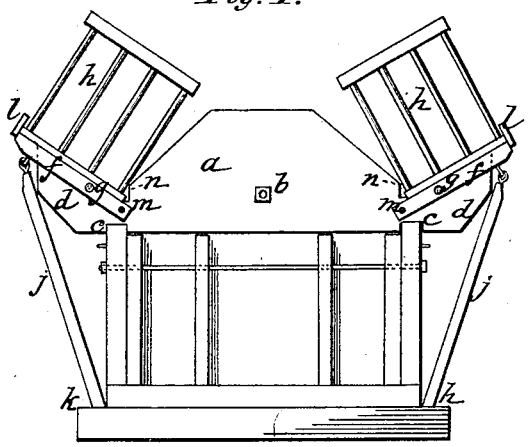
Figure 3:
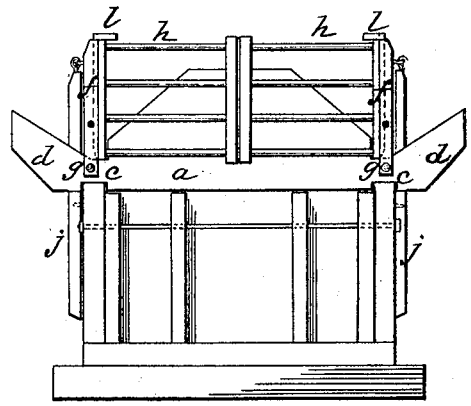
Figure 2:
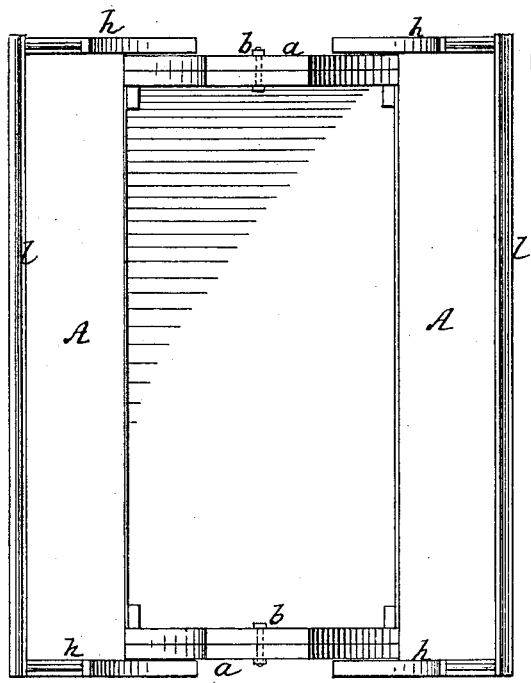
Figure 4:
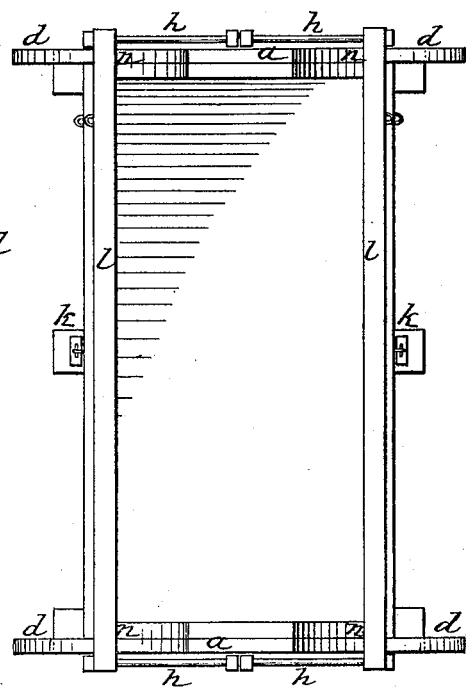

In the accompanying drawings, Figure 1 represents a front-end elevation of the combined grain and stock rack as adapted for hay and grain; Fig. 2, a top view of the same; Fig. 3, a front-end elevation, showing the rack-raves closed for use as a stock-wagon; and Fig. 4 a top view of the same.

The wagon may be of any construction suitable for the purpose.

The rack-raves A are supported upon cross-pieces *a*, which are secured each by a bolt, *b*, to the outer sides of head and tail boards of the body, and by notches *c*, which fit over and upon the edges of the body sides. These cross-pieces *a* have extensions *d*, with upwardly-inclined seats for the rack-raves, so that the latter pitch downward toward the body. The front cross-piece is fixed, but the rear one is removable with the tail-board, to facilitate loading and unloading. The rack-raves spread outward from the body, fit over and upon its sides, and are provided with end cross-bars *f*, which fit against the outer sides of the extensions *d*, to hold the rack-raves from end movement, and to receive the bolts *g*, by which they are secured to said extensions, the securing-bolts passing through these parts near the middle of the length of said cross-bars. The rack-raves are provided with vertical end racks *h*, which stand in positions just outside of the cross-pieces. The rack-raves are of thin close boards, and are supported at their outer edges in the middle of their length by brace-bars *j* hinged to the rack-raves and resting upon a cross-timber, *k*, at the bottom of the body, or in any suitable way that will sustain them under the weight of the grain or hay resting thereon. Outer edge-guards *l* rise from the raves, to keep the loose grain from passing off, and strengthen them. The height of the vertical racks is equal to half the width of the body, for a purpose presently stated.

As described, the rack-raves are arranged, secured, and supported as shown in Figs. 1 and 2 for carrying hay and grain in the sheaf.

By bringing the rack-raves into upright positions the depth of the wagon-body is increased, the ends being closed by the racks forming bar-gates, to adapt the wagon for carrying stock. In Figs. 2 and 3 this adaptation is shown, and is effected by having the rack-raves removable for adjustment to the different positions indicated. The cross-bars *f* and the extensions *d* are each provided with two holes, one, *m*, being at the inner ends of the cross-pieces, which project a little beyond the raves. In adapting the wagon for stock, the bolts *g* are removed and the raves drawn out upon the extension *d*, to bring the inner sets of the holes coincident, and the bolts are secured therein and serve as pivots upon which the rack-raves are turned up in vertical positions in line with the wagon-sides, and which will bring their end rack-rails over against each other at the outer sides of the head and tail boards, to form a top inclosure to the body and give the required depth thereto for carrying stock. In this position they may be tied together or secured in any other way. The moving of the rack raves outwardly is to obtain sufficient room to allow them to be turned up and against shoulders $n$ in the cross-pieces and ends of the wagon. When in this position the rear movable end racks are secured in the inner holes of the raves. By this construction and adaptation a comparatively shallow open body may be converted into a deep one. In removing the rear tail-board the cross-piece is taken off, and the rear ends of the rack-raves are held up by any means, and these parts are again replaced when the body is filled. Cross-battens are secured to the under sides of the raves to strengthen the connections of the hinged brace-bars. When used as a stock-rack these hinged bars hang by the sides of raves and the body of the wagon.

I claim—

1. The rack-raves, in combination with the supporting notched end cross-pieces $a\ d$ and the wagon-body, constructed and secured in the manner and for the purpose herein set forth.

2. The rack-raves, provided with the edge-guards $l$, the end cross-bars $f$, and the end vertical racks $h\ h$, and secured in place in the manner herein set forth.

3. The rack-raves, in combination with the hinged brace-bars $j$ and the wagon-body, as herein set forth.

4. The rack-raves and the cross-pieces $a\ d$, provided with the inner holes $m$ for the fastening-bolts $g$, to serve as pivots upon which said rack-raves are raised to vertical positions with the sides, as and for the purpose herein set forth.

JOSHUA C. WRIGHT.

Witnesses:
W. H. GILHOUSEN,
GEORGE RAUSCHER.